United States Patent
Lin

(10) Patent No.: US 7,967,052 B2
(45) Date of Patent: Jun. 28, 2011

(54) VEHICLE ROOF BLIND ASSEMBLY

(75) Inventor: Paul Lin, Tainan Hsien (TW)

(73) Assignee: Macauto Industrial Co., Ltd., Yung-Kang (TW)

( * ) Notice: Subject to any disclaimer, the term of this patent is extended or adjusted under 35 U.S.C. 154(b) by 199 days.

(21) Appl. No.: 12/350,424

(22) Filed: Jan. 8, 2009

(65) Prior Publication Data

US 2010/0170645 A1    Jul. 8, 2010

(51) Int. Cl.
*B60J 7/06* (2006.01)
(52) U.S. Cl. .............. 160/370.22; 160/273.1; 296/219
(58) Field of Classification Search ............ 160/370.22, 160/273.1, 269, 271, 272, 290.1; 296/97.8, 296/97.7, 98, 142, 143, 219
See application file for complete search history.

(56) References Cited

U.S. PATENT DOCUMENTS

| | | | |
|---|---|---|---|
| 6,179,373 B1 * | 1/2001 | Bohm et al. ................... | 296/214 |
| 6,691,761 B1 * | 2/2004 | Alkhoury et al. .......... | 160/273.1 |
| 7,798,568 B2 * | 9/2010 | Keller ............................ | 296/214 |
| 2004/0068839 A1 * | 4/2004 | Hock et al. ....................... | 16/215 |
| 2008/0179021 A1 * | 7/2008 | Biewer et al. ................. | 160/243 |
| 2009/0145559 A1 * | 6/2009 | Glasl et al. ................. | 160/273.1 |

* cited by examiner

*Primary Examiner* — David Purol
(74) *Attorney, Agent, or Firm* — Frommer Lawrence & Haug LLP; Ronald R Santucci

(57) ABSTRACT

A vehicle roof blind assembly includes a guide rail having upper and lower slide grooves, a pull rod, and a slide member having a slide portion extending slidably into the upper slide groove. A fabric blind has a transverse end portion connected to the pull rod, and a longitudinal insert portion received slidably in the lower slide groove and including first and second insert parts, and an angled part interconnecting the first and second insert parts. A guiding device is connected to the slide member, and includes a guide insert projecting into the lower slide groove and into the angled part between the first and second insert parts so as to push the angled part transversely of the fabric blind and inwardly of the lower slide groove.

7 Claims, 5 Drawing Sheets

VEHICLE ROOF BLIND ASSEMBLY

BACKGROUND OF THE INVENTION

1. Field of the Invention

This invention relates to a blind assembly, more particularly to a vehicle roof blind assembly.

2. Description of the Related Art

Referring to FIGS. 1 and 2, a conventional vehicle roof blind assembly 1 generally includes two guide rails 11 (only one is shown) each having upper and lower slide grooves 111, 112, a fabric blind 12 which is wound and unwound by a winding device (not shown) and which has a main body 121, and two longitudinal insert portions 122 (only one is shown) each projecting from a left or right side of the main body 121 into the lower slide groove 112 of the respective guide rail 11 and making a return bending upwardly so as to abut resiliently against an inner wall face of the lower slide groove 112, a pull rod 13 fixed to a transverse front end of the fabric blind 12, and two slide members 14 (only one is shown) each having a connecting portion 141 connected to one lateral end of the pull rod 13, a slide portion 142 extending slidably into the upper slide groove 111, and a plate portion 143 connected between the connecting and slide portions 141, 142. When the pull rod 13 is pulled by a user so as to unwind the fabric blind 12 from the winding device, the slide members 14 are pulled by the pull rod 13 to move along the guide rails 11. Because the front end of the fabric blind 12 is connected to the pull rod 13, the fabric blind 12 is stretched tautly between the guide rails 11.

However, the rigidity of the fabric blind 12 changes in accordance with the ambient temperature. In particular, if the ambient temperature is high, the material of the fabric blind 12 softens. Because the fabric blind 12 has a cutout 120 at the juncture of each lateral end of the pull rod 13 and the corresponding longitudinal insert portion 122, and the slide members 14 are disposed respectively in the cutouts 120 at the lateral ends of the pull rod 13, the longitudinal insert portions 122 of the fabric blind 12 are not directly pulled by the pull rod 13, but depend only on the pulling force of the main body 121 so as to move along the guide rails 11. Thus, when the fabric blind 12 softens, the fabric blind 12 is likely to sag, and, assuming an opening in the vehicle roof is open, is prone to vigorous shaking due to the strong wind induced upon movement of the vehicle. This situation can cause the longitudinal insert portions 122 to deform and even escape from the lower slide grooves 112. In addition, if the longitudinal insert portions 122 undergo such deformation, they will be unable to slide smoothly within the lower slide grooves 112 due to increased friction between each longitudinal insert portion 122 and the respective guide rail 11.

SUMMARY OF THE INVENTION

Therefore, the object of the present invention is to provide a vehicle roof blind assembly that is capable of overcoming the aforementioned drawbacks of the prior art.

According to this invention, a vehicle roof blind assembly comprises a guide rail having upper and lower slide grooves, a pull rod, a slide member, a fabric blind, and a guiding device. The slide member has a connecting portion connected to a lateral end of the pull rod, and a slide portion extending slidably into the upper slide groove. The fabric blind has a transverse end portion connected to the pull rod, and a longitudinal insert portion received slidably in the lower slide groove and including a first insert part, a second insert part extending over the first insert part, and an angled part interconnecting the first and second insert parts. The guiding device is connected to the slide member, and includes a guide insert projecting into the lower slide groove and into the angled part between the first and second insert parts so as to push the angled part transversely of the fabric blind and inwardly of the lower slide groove.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
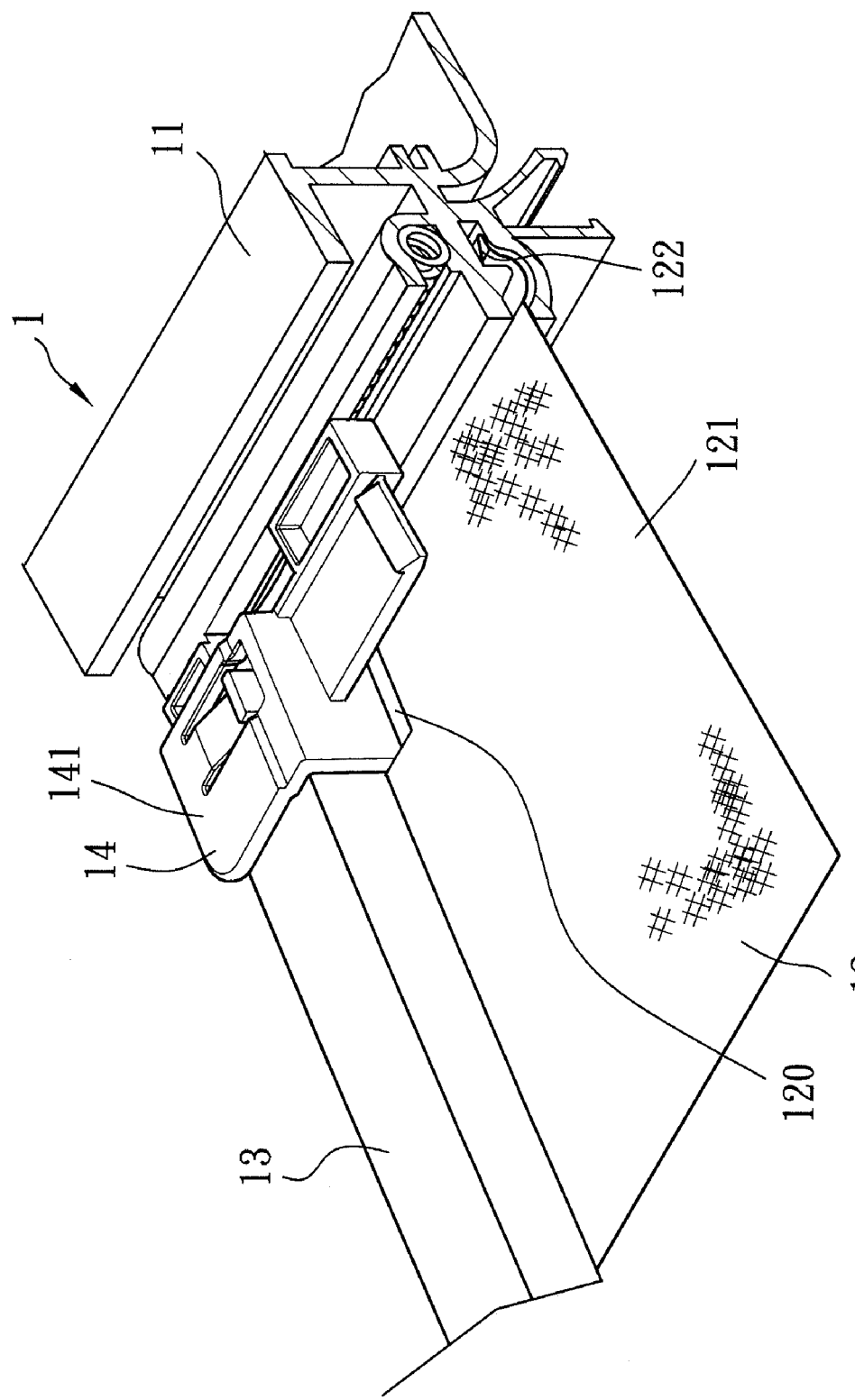
FIG. 1 is a fragmentary perspective view of a conventional vehicle roof blind assembly.
Figure 2:
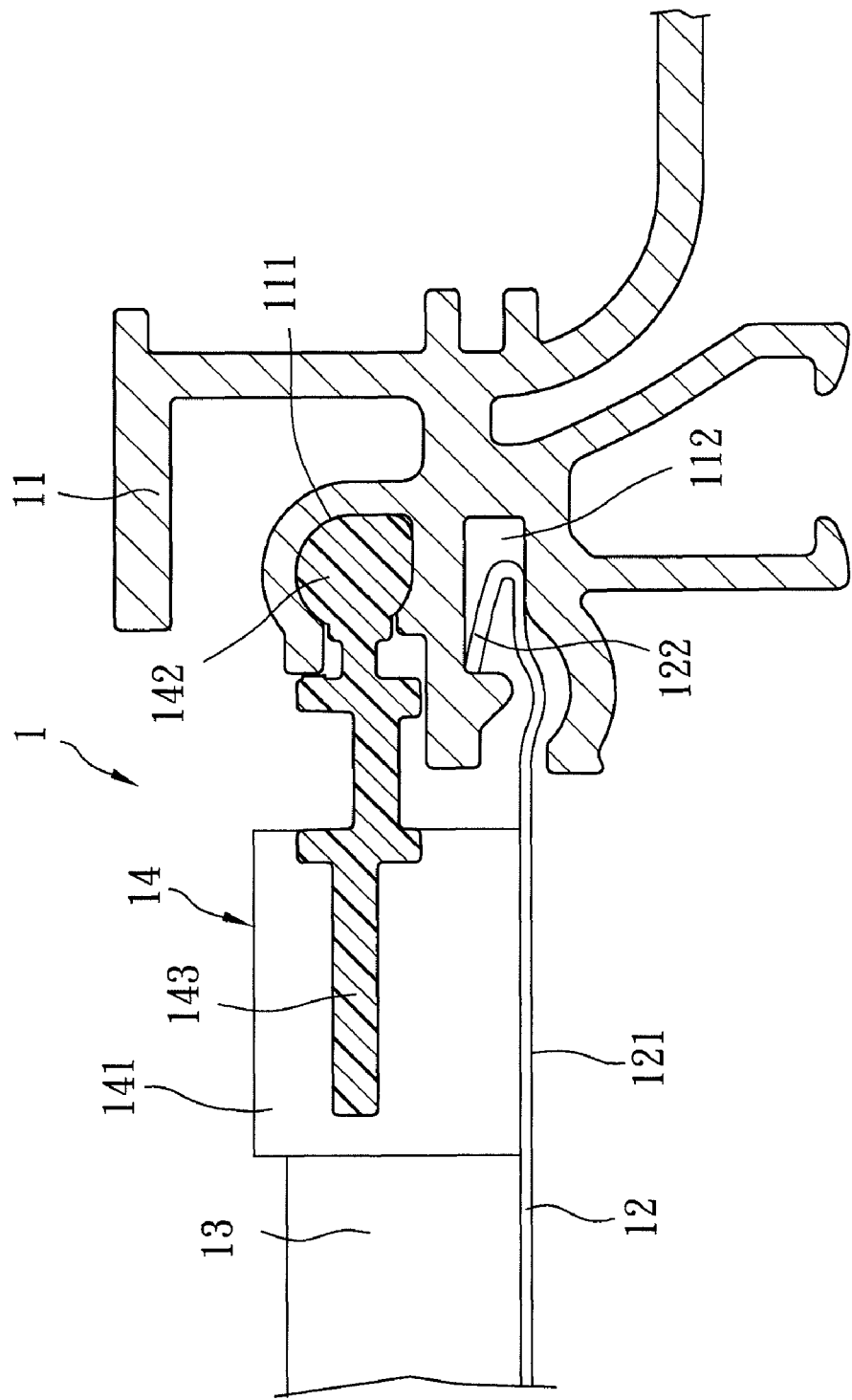
FIG. 2 is a fragmentary sectional view of the conventional vehicle roof blind assembly of FIG. 1.
Figure 3:
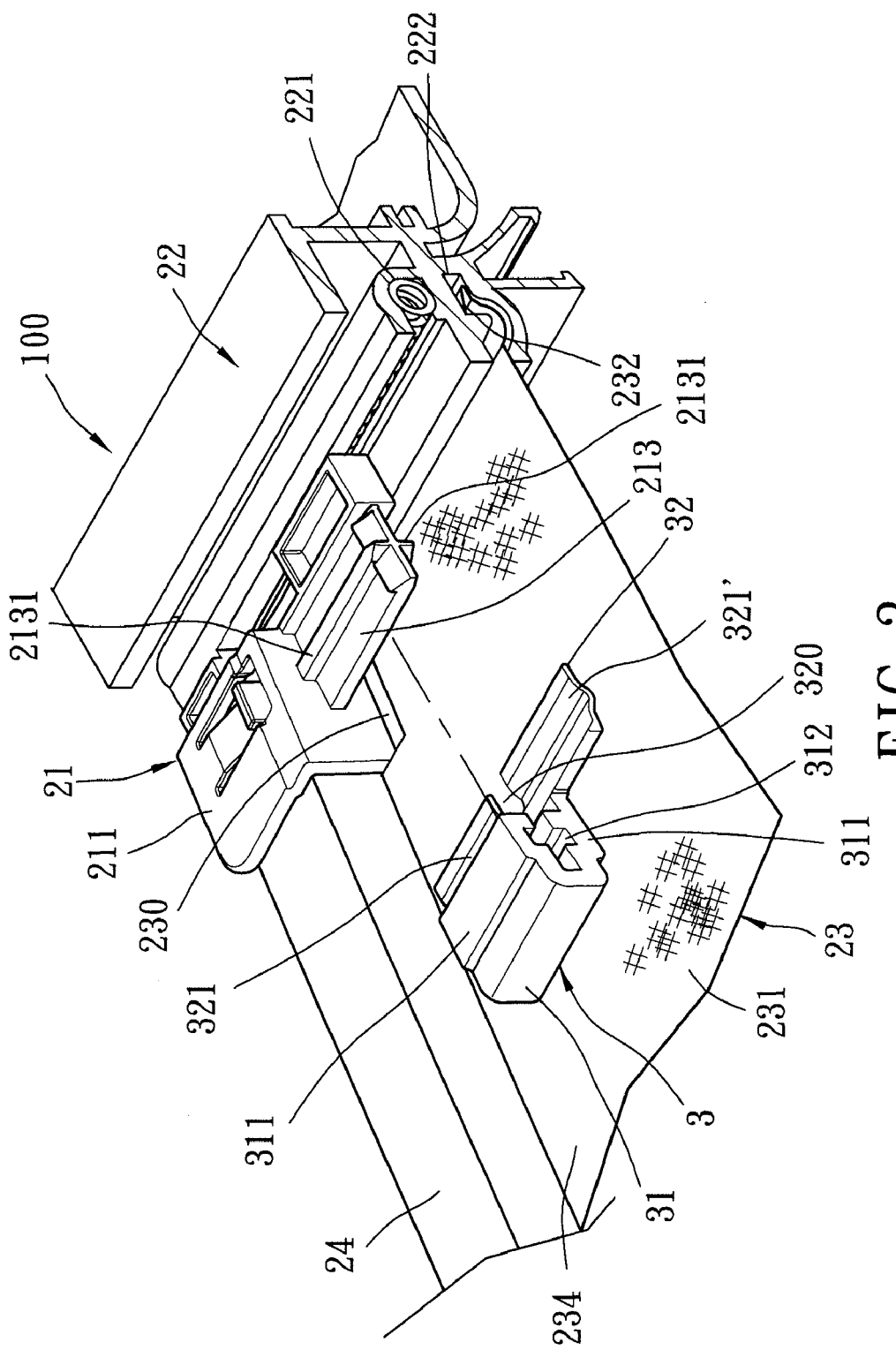
FIG. 3 is a fragmentary partly exploded perspective view of a vehicle roof blind assembly according to the preferred embodiment of this invention.
Figure 4:
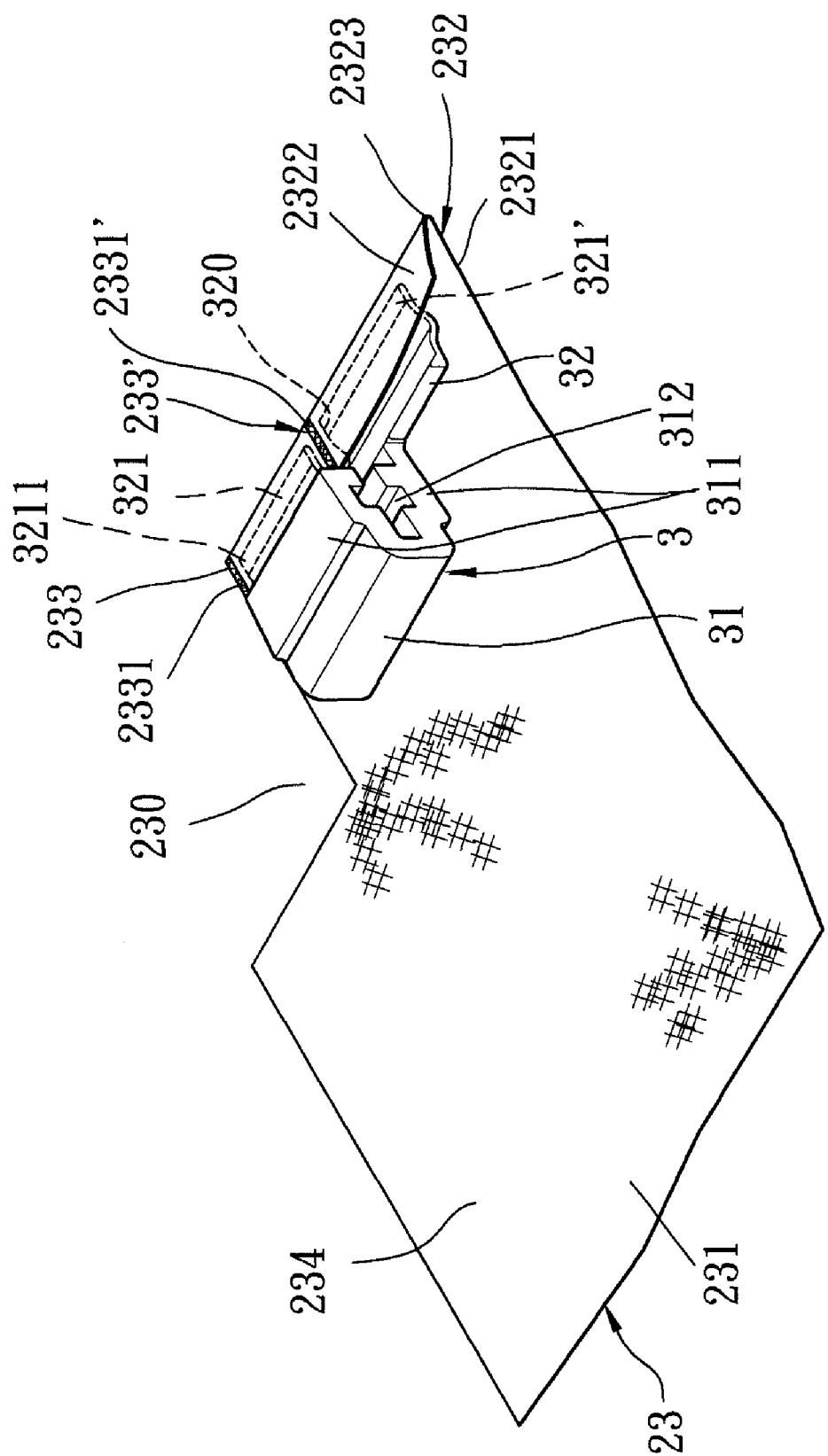
FIG. 4 is a perspective view of the preferred embodiment, illustrating how a guiding device is connected to a longitudinal insert portion of a fabric blind.
Figure 5:
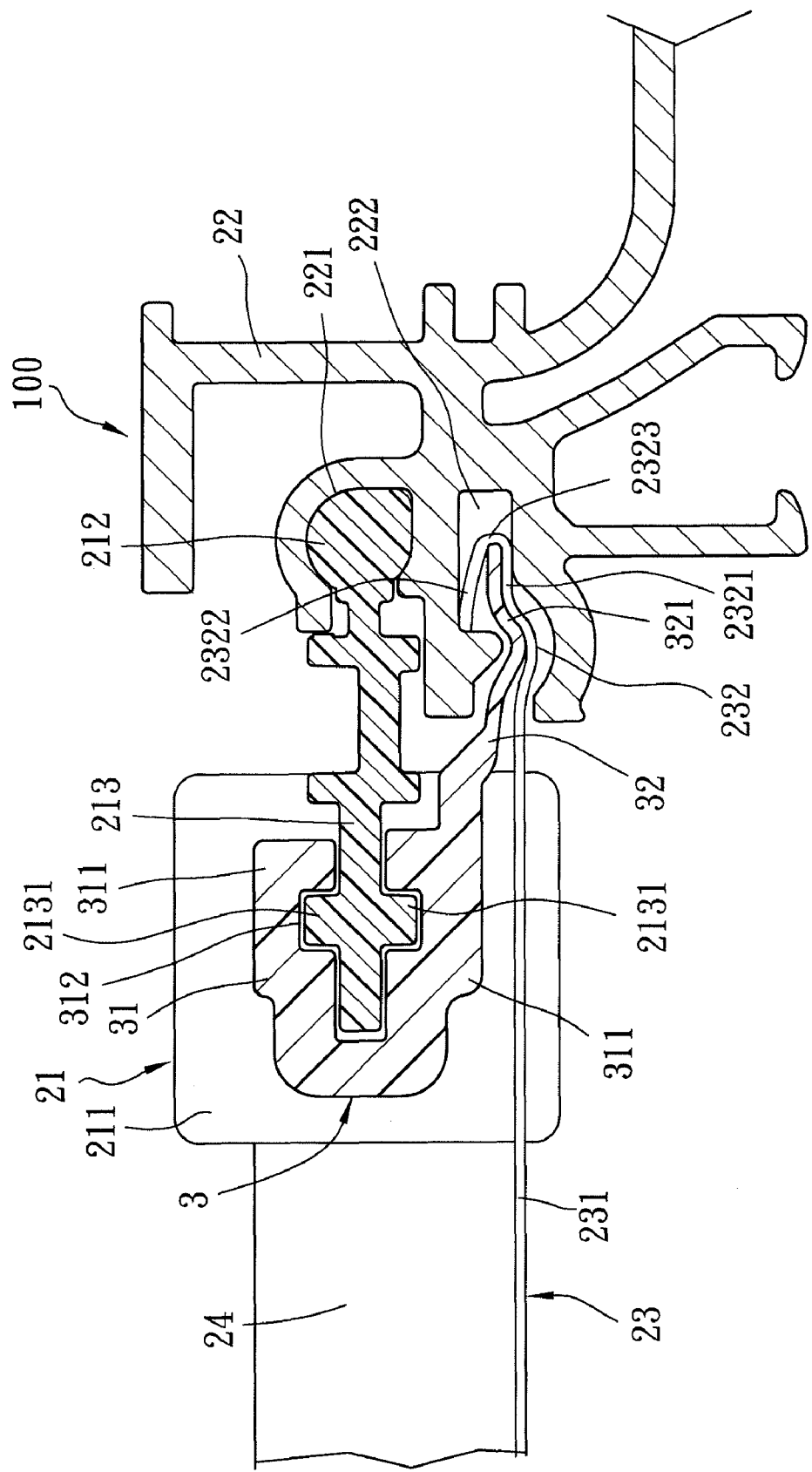
FIG. 5 is a fragmentary sectional view of the preferred embodiment.

Referring to FIGS. 3 to 5, a vehicle roof blind assembly 100 according to the present invention comprises left and right guide rails 22 (only the right one is shown and described for the sake of brevity), a pull rod 24, left and right slide members 21 (only the right one is shown and described for the sake of brevity), a fabric blind 23, and left and right guiding devices 3 (only the right one is shown and described for the sake of brevity).

The guide rail 22 has upper and lower slide grooves 221, 222 extending from a front end to a rear end thereof and opening toward a left side thereof.

The slide member 21 has a connecting portion 211 connected to a lateral end of the pull rod 24, a slide portion 212 extending slidably into the upper slide groove 221, and a plate portion 213 connected between the connecting and slide portions 211, 212. The plate portion 213 has upper and lower ribs 2131 projecting oppositely therefrom.

The fabric blind 23 has a main body 231, a transverse end portion 234 connected to the pull rod 24, a longitudinal insert portion 232 received slidably in the lower slide groove 222, and a cutout 230 formed at a juncture of the transverse end portion 234 and the longitudinal insert portion 232. The longitudinal insert portion 232 includes a first insert part 2321, a second insert part 2322 extending over the first insert part 2321 so as to abut against an inner wall face of the lower slide groove 222, and an angled part 2323 interconnecting the first and second insert parts 2321, 2322. The connecting portion 211 of the slide member 21 and the lateral end of the pull rod 24 are disposed in the cutout 230.

A retaining member 233 is disposed transversely of the longitudinal insert portion 232 adjacent to the cutout 230. In this embodiment, the retaining member 233 is a retaining stitch line 2331 stitching the second insert part 2322 to the first insert part 2321. An interlocking member 233' is provided transversely on the longitudinal insert portion 232 spaced apart from the retaining member 233. In this embodiment, the interlocking member 233' is an interlocking stitch line 2331' stitching the second insert part 2322 to the first insert part 2321 at a spaced apart position from the retaining stitch line 2331.

The guiding device 3 is disposed in proximity to the cutout 230, and includes a securing portion 31, a guide insert 32, and a notch 320. The securing portion 31 includes upper and lower clamp sections 311 cooperatively defining a substantially cross-shaped retaining groove 312 which opens at a right end thereof and which engages the upper and lower ribs 2131 of the plate portion 213, so that the plate portion 213 is retained between the upper and lower clamp sections 311. The guide insert 32 projects from the securing portion 31 into the lower slide groove 222 and into the angled part 2323 of the longitudinal insert portion 232 of the fabric blind 23 so as to push the angled part 2323 transversely of the fabric blind 23 and inwardly of the lower slide groove 222. The notch 320 is formed in a central portion of the guide insert 32 to engage the interlocking stitch line 2331'. The guide insert 32 has two guide sections 321, 321' disposed on two opposite sides of the notch 320 and projecting outwardly, downwardly, and inclinedly from the lower clamp section 311 into the angled part 2323. The guide section 321 projects between the retaining and interlocking stitch lines 2331, 2331', and has a transverse end 3211 engageable with the retaining stitch line 2331. The guide section 321' projects adjacent to and is engageable with the interlocking stitch line 2331'.

The blind assembly 100 of the present invention is assembled to the vehicle roof in a conventional manner. When the fabric blind 23 is pulled by pulling the pull rod 24, the slide members 21 and the guiding devices 3 are moved along the guide rails 22. At this time, the central portion of the fabric blind 23 is pulled by the pull rod 24, and the left and right sides of the fabric blind 23, i.e., the longitudinal insert portions 232, are simultaneously pulled by the guiding devices 3. Since the guide sections 321, 321' of the guiding devices 3 push the angled parts 2323 of the respective longitudinal insert portions 232 of the fabric blind 23 transversely of the fabric blind 23 and inwardly of the lower slide grooves 222 of the guide rails 22, the fabric blind 23 is stretched transversely, oppositely, and tautly, so that the fabric blind 23 will not flex and sag when subjected to high ambient temperature that can soften the fabric blind 23. If the fabric blind 23 does not sag, assuming an opening in the vehicle roof is open, the fabric blind 23 is not easily shaken in a vigorous manner by the wind during movement of the vehicle. Hence, damage to the fabric blind 23 can be reduced to a minimum.

In this embodiment, the purpose of providing the notch 320 in the guide insert 32 of the guiding device 3 is to enhance the interlocking of the guide insert 32 with the longitudinal insert portion 232 of the fabric blind 23 and to thereby facilitate the pulling of the longitudinal insert portion 232 by the guide insert 32. Alternatively, the notch 320 and the stitch line 2331' may be dispensed herewith.

From the aforementioned description, it is apparent that through the presence of the guiding devices 3 in the vehicle roof blind assembly 100 of the present invention so that the slide members 21 can be directly clamped by the guiding devices 3 and the left and right sides of the fabric blind 23 can be positioned within the guide rails 22, the fabric blind 23 can be unwound smoothly, and the left and right sides thereof can also be prevented from moving out of the guide rails 22. Hence, damage to the fabric blind 23 can be reduced to a minimum.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A vehicle roof blind assembly comprising:
   a guide rail having upper and lower slide grooves;
   a pull rod;
   a slide member having a connecting portion connected to a lateral end of said pull rod, and a slide portion extending slidably into said upper slide groove;
   a fabric blind having a transverse end portion connected to said pull rod, and a longitudinal insert portion received slidably in said lower slide groove and including a first insert part, a second insert part extending over said first insert part, and an angled part interconnecting said first and second insert parts; and
   a guiding device connected to said slide member and including a guide insert projecting into said lower slide groove and into said angled part between said first and second insert parts so as to push said angled part transversely of said fabric blind and inwardly of said lower slide groove;
   wherein said fabric blind further has a cutout provided at a juncture of said transverse end portion and said longitudinal insert portion, said guiding device being disposed in proximity to said cutout;
   wherein said longitudinal insert portion further includes a retaining member disposed transversely of said longitudinal insert portion adjacent to said cutout and connecting a free end of said second insert part to a free end of said first insert part, and an interlocking member provided transversely on said longitudinal insert portion and connecting said second insert part to said first insert part at a spaced apart position from said retaining member; and
   wherein said guide insert is prevented by said retaining member from moving longitudinally and outwardly from said longitudinal insert portion, and has a notch to engage said interlocking member.

2. The vehicle roof blind assembly of claim 1, wherein said retaining member is a retaining stitch line, said guide insert having one transverse end engageable with said retaining stitch line.

3. The vehicle roof blind assembly of claim 1, wherein said interlocking member is an interlocking stitch line spaced apart from said retaining stitch line.

4. A vehicle roof blind assembly comprising:
   a guide rail having upper and lower slide grooves;
   a pull rod;
   a slide member having a connecting portion connected to a lateral end of said pull rod, and a slide portion extending slidably into said upper slide groove;
   a fabric blind having a transverse end portion connected to said pull rod, and a longitudinal insert portion received slidably in said lower slide groove and including a first insert part, a second insert part extending over said first insert part, and an angled part interconnecting said first and second insert parts; and
   a guiding device connected to said slide member and including a guide insert projecting into said lower slide groove and into said angled part between said first and second insert parts so as to push said angled part transversely of said fabric blind and inwardly of said lower slide groove;
   wherein said fabric blind further has a cutout provided at a juncture of said transverse end portion and said longitudinal insert portion, said guiding device being disposed in proximity to said cutout;

wherein said longitudinal insert portion further includes a retaining member disposed transversely of said longitudinal insert portion adjacent to said cutout and connecting said second insert part to said first insert part, said guide insert being prevented by said retaining member from moving longitudinally and outwardly from said longitudinal insert portion;

wherein said longitudinal insert portion further includes an interlocking member provided transversely on said longitudinal insert portion and connecting said second insert part to said first insert art at a spaced apart position from said retaining member, said guide insert having a notch to engage said interlocking member;

wherein said interlocking member is an interlocking stitch line spaced a art from said retaining stitch line; and wherein said guide insert has two longitudinally spaced-apart guide sections disposed on two opposite sides of said notch and projecting into said angled part on two opposite sides of said interlocking stitch line, one of said guide sections projecting in between said retaining and interlocking stitch lines.

5. A vehicle roof blind assembly comprising:

a guide rail having upper and lower slide grooves;

a pull rod;

a slide member having a connecting portion connected to a lateral end of said pull rod, and a slide portion extending slidably into said upper slide groove;

a fabric blind having a transverse end portion connected to said pull rod, and a longitudinal insert portion received slidably in said lower slide groove and including a first insert part, a second insert part extending over said first insert part, and an angled part interconnecting said first and second insert parts; and a guiding device connected to said slide member and including a guide insert projecting into said lower slide groove and into said angled part between said first and second insert parts so as to push said angled part transversely of said fabric blind and inwardly of said lower slide groove;

wherein said slide member further has a plate portion connected between said connecting and slide portions, said guiding device further including a securing portion connected to said plate portion, said guide insert projecting from said securing portion into said angled part.

6. The vehicle roof blind assembly of claim 5, wherein said securing portion includes upper and lower clamp sections cooperatively defining a retaining groove therebetween, said plate portion being retained in said retaining groove.

7. The vehicle roof blind assembly of claim 6, wherein said plate portion has upper and lower ribs projecting oppositely from said plate portion, said retaining groove engaging said upper and lower ribs.

* * * * *